(12) United States Patent
Dubin et al.

(10) Patent No.: US 11,861,955 B1
(45) Date of Patent: Jan. 2, 2024

(54) UNIFIED PLATFORM FOR ASSET MONITORING

(71) Applicant: Samsara Inc., San Francisco, CA (US)

(72) Inventors: Hannah Dubin, San Francisco, CA (US); Kevin Omwega, Austin, TX (US); Jennifer Nguyen, San Francisco, CA (US); Arthur Pohsiang Huang, San Francisco, CA (US); James Robert Saunders, San Francisco, CA (US); David Brablec, Arlington Heights, IL (US); Evan Meagher, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/816,920

(22) Filed: Aug. 2, 2022

Related U.S. Application Data

(60) Provisional application No. 63/367,196, filed on Jun. 28, 2022.

(51) Int. Cl.
| | |
|---|---|
| *G07C 5/08* | (2006.01) |
| *G07C 5/00* | (2006.01) |
| *G07C 5/10* | (2006.01) |
| *G05B 19/418* | (2006.01) |

(52) U.S. Cl.
CPC ....... *G07C 5/0841* (2013.01); *G05B 19/4183* (2013.01); *G07C 5/006* (2013.01); *G07C 5/0808* (2013.01); *G07C 5/10* (2013.01)

(58) Field of Classification Search
CPC .......... G07C 5/0841; G07C 5/08; G07C 5/00; G07C 5/12; G07C 5/006; G07C 5/02; G07C 5/06; G07C 5/10; G05B 19/4183
See application file for complete search history.

(56) References Cited

U.S. PATENT DOCUMENTS

| | | |
|---|---|---|
| 5,917,433 A | 6/1999 | Keillor et al. |
| 6,157,864 A | 12/2000 | Schwenke et al. |
| 6,452,487 B1 | 9/2002 | Krupinski |
| 6,801,920 B1 | 10/2004 | Wischinski |
| 7,596,417 B2 | 9/2009 | Fister et al. |
| 7,957,936 B2 | 6/2011 | Eryurek et al. |
| 8,633,672 B2 | 1/2014 | Jung et al. |
| 9,024,744 B2 | 5/2015 | Klose et al. |
| 9,230,250 B1 | 1/2016 | Parker et al. |
| 9,445,270 B1 | 9/2016 | Bicket et al. |
| 9,477,639 B2 | 10/2016 | Fischer et al. |
| 10,033,706 B2 | 7/2018 | Bicket et al. |

(Continued)

OTHER PUBLICATIONS

Elias N. Malamas et al. "A survey on industrial vision systems, applications and tools", Sep. 17, 2002, Image and Vision Computing 21, pp. 171-188.

*Primary Examiner* — Manuel L Barbee
(74) *Attorney, Agent, or Firm* — Knobbe, Martens Olson & Bear, LLP

(57) ABSTRACT

A unified asset monitoring portal may be provided by a computing system that is configured to receive asset data from each of a plurality of assets. The asset data may include vehicle data associated with a first plurality of vehicles, trailer data associated with a second plurality of trailers, and/or industrial data associated with a third plurality of industrial equipment. Each of the vehicle data, trailer data, and industrial data may include at least some unique sensor data types.

20 Claims, 12 Drawing Sheets

(56) References Cited

U.S. PATENT DOCUMENTS

| | | |
|---|---|---|
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,388,075 B2 | 8/2019 | Schmirler et al. |
| 10,390,227 B2 | 8/2019 | Bicket et al. |
| 10,444,949 B2 | 10/2019 | Scott et al. |
| 10,579,123 B2 | 3/2020 | Tuan et al. |
| 10,609,114 B1 | 3/2020 | Bicket et al. |
| 10,623,899 B2 | 4/2020 | Watkins et al. |
| 10,827,324 B1 | 11/2020 | Hajimiri et al. |
| 10,843,659 B1 | 11/2020 | Innocenzi et al. |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 11,599,097 B1 | 3/2023 | Gal et al. |
| 11,606,736 B1 | 3/2023 | Lloyd et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 2002/0061758 A1 | 5/2002 | Zarlengo et al. |
| 2002/0169850 A1 | 11/2002 | Batke et al. |
| 2005/0286774 A1 | 12/2005 | Porikli |
| 2006/0167591 A1 | 7/2006 | McNally |
| 2008/0319602 A1 | 12/2008 | McClellan et al. |
| 2009/0240427 A1 | 9/2009 | Siereveld et al. |
| 2010/0049639 A1 | 2/2010 | Ferro et al. |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0211559 A1 | 8/2013 | Lawson et al. |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0226563 A1 | 8/2015 | Cox et al. |
| 2015/0283912 A1 | 10/2015 | Shimizu et al. |
| 2016/0086393 A1* | 3/2016 | Collins .................. A61B 5/024 701/31.5 |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0140603 A1 | 5/2017 | Ricci |
| 2017/0169634 A1* | 6/2017 | Mattern ................. G06Q 10/20 |
| 2017/0195265 A1 | 7/2017 | Billi et al. |
| 2017/0263049 A1 | 9/2017 | MacDonald et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0113897 A1* | 4/2018 | Donlan ................. G06F 16/248 |
| 2018/0234514 A1 | 8/2018 | Rajiv et al. |
| 2018/0262724 A1 | 9/2018 | Ross |
| 2018/0356800 A1 | 12/2018 | Chao et al. |
| 2018/0364686 A1 | 12/2018 | Naidoo et al. |
| 2019/0003848 A1 | 1/2019 | Hoten et al. |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0309559 A1* | 10/2019 | Hall ........................ E05F 15/71 |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2019/0339860 A1* | 11/2019 | Chen ................... G06F 3/04847 |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2021/0006950 A1 | 1/2021 | Hajimiri et al. |
| 2021/0312726 A1* | 10/2021 | Schäfer ................. G06Q 50/30 |
| 2023/0219592 A1 | 7/2023 | Calmer et al. |

\* cited by examiner

Assets

Vehicles  Trailers  Equipment  Unpowered  All

◇Tags ▽ | Attributes ▽ | Geofence ▽   🔍 Search   ‹ 1 of 4 ›   ⋮

| Asset Name | Asset Type | Location/Geofence | Running Status | Utilization (Last 7 Days) | Total Engine Hours | Maintenance Due | Issues ▽ |
|---|---|---|---|---|---|---|---|
| 4118 - 650J | Equipment | ◇Jacobsonbury, CA | RUNNING | 121% | 362h | Overdue 18 h | ⚠1 ⊙1 ▭1 |
| 4116 - 750C | Equipment | ◎St Joseph, WI 4 min ago | RUNNING | 100% | 520h | in 7 h | ⚠1 ⊙2 ▭4 |
| 4118 - 650X | Vehicle | ◎St Joseph, WI 3 min ago | RUNNING | 100% | 359h | in 10 h | |
| 4206 - 390FL | Trailer | ◇Madison Street, Petaluma, CA | RUNNING | 100% | 187h | in 11 h | ⚠1 ▭1 |

< Back

4206 - 390FL
POWERED EQUIPMENT
◇ Madison Street, Petaluma, CA

Alerts ⚠ 2 ⌄

Details ⌄

Diagnostics ⌄
Engine Oil Level — 34%
Engine Coolant Temp — 40° C
Engine Air Filter — 12 kPa
Fuel Level — 3 Gal
Fuel Rate — 0.35 GPH
Battery Voltage — 28.45 V
View all diagnostics ⌄

Gateway
🔲 IG15
G25-16H-1583 [CONNECTED] ⌄

Notes

◇ Diagnostics ⊗

🔍 Search

Aux IO
Digital Input #1 — ON
Digital Input #2 — OFF

Diagnostics
Air Filter 1 Differential Press... — 12 kPa
Battery Voltage — 12.0 V
Coolant Temperature — 40° C
Engine Load — 65%
Fuel Level — 36%
Fuel Pressure — 14 kPa
Fuel Rate — 0.35 GPH
Oil Temperature — 40° C
Oil Pressure — 12 kPa
Oil Level — 34%
Run Hours — 354 Hours
Running Status — Running ⟳ Analyze Data (1)

⟳ Analyze Data ‹ 🗓 Last 7 Days ›

(map with Amazon Prime - Austin, Metric Blvd, Rutlin Dt, Gray Blvd, Cawoods Produce, Cir)

Upcoming Maintenance
Miles Remaining
234 mi
Next Service Date
Jan 14, 2022 due in
11 h

Run Status
Current State
[RUNNING]
Engine Hours
1,802 h 12 am
6 pm
12 pm
6 am
S M T W T F S

Maintenance History - 4206 - 390FL

⚠ This asset is due for maintenance in 11 engine hours or by Jan 14, 2022.

Last 30 Days › Status ⌄    🔍 Search    ‹ 1 of 4 ›    Schedule

| Maintenance Item | Engine Hours | Scheduled at | Status | | |
|---|---|---|---|---|---|
| Oil Change | 6,588 h | 182,254 mi | Due in 11 h | Resolve | Snooze... |
| PM Service | 6,588 h | Dec 2, 2020 | Overdue 16 days | Resolve | Snooze... |
| Oil Change | 6,588 h | 143,215 mi | Completed | | |
| PM Service | 6,588 h | Dec 2, 2020 | Completed | | |
| Oil Change | 6,588 h | 143,215 mi | Completed | | |

FIG. 5C

Diagnostics
Select preferred diagnostics for your organization's assets

| | Asset Name | Asset type | Enabled | Favorited | |
|---|---|---|---|---|---|
| ☑ | 37843 | Trailer | 51 | 6 | Configure |
| ☑ | 73979 | Trailer | 52 | 6 | Configure |
| ☑ | 22365 | Vehicle | 67 | 6 | Configure |
| ☑ | 60067 | Vehicle | 46 | 6 | Configure |
| ☑ | 85550 | Industrial | 94 | 6 | Configure |

Tags ▽ | Attributes ▽ | Geofence ▽

🔍 Search

FIG. 6A

Diagnostics
Select preferred diagnostics for your organization's assets

[ⓘ Tags ▾] [Attributes ▾] [Geofence ▾]

6 assets selected. Clear all

| | Asset Name | Asset Type | Enabled |
|---|---|---|---|
| ☑ | 37843 | Trailer | 51 |
| ☑ | 73979 | Trailer | 52 |
| ☑ | 22365 | Vehicle | 67 |
| ☑ | 60067 | Vehicle | 46 |
| ☑ | 85550 | Industrial | 94 |

⊠ Configure diagnostics for 5 assets
🔍 Search diagnostics...

☐ 1001 Air Filter 1 Differential Pressure
☑ 1001 Battery Voltage
☑ 1001 Coolant Temperature
☑ 1001 Engine Load
☐ 1001 Fuel Level
☐ 1001 Fuel Pressure
☐ 1001 Fuel Rate
☐ 1001 Oil Level
☐ 1001 Run Hours
☐ 1001 Running Status
☐ 1001 Air Filter 1 Differential Pressure
☐ 1001 Fuel Level
☐ 1001 Fuel Pressure
☐ 1001 Oil Level
☐ 1001 Run Hours
☐ 1001 Running Status
☐ 1001 Air Filter 1 Differential Pressure 4 Selected Clear all    [Cancel] [Save]

FIG. 6B

UNIFIED PLATFORM FOR ASSET MONITORING

TECHNICAL FIELD

Embodiments of the present disclosure relate to devices, systems, and methods that provide asset monitoring.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices can collect user data on a large scale for a variety of applications. For example, devices attached to a vehicle can be used to monitor and maintain the vehicle. Similarly, devices attached to heavy industrial equipment can collect data that can be used to monitor and maintain the equipment.

SUMMARY

A unified asset monitoring portal may be provided by a computing system that is configured to receive asset data from each of a plurality of assets. The asset data may include vehicle data associated with a first plurality of vehicles, trailer data associated with a second plurality of trailers, and/or industrial data associated with a third plurality of industrial equipment (e.g., powered or unpowered assets). Each of the vehicle data, trailer data, and industrial data may include at least some unique sensor data types. The portal may include a user interface configured to display an asset overview panel including identifiers of one or more vehicles, trailers, and industrial equipment. The portal may be configured to receive a user selection of a first asset of the one or more vehicles, trailers, and industrial equipment included in the asset overview and, in response to the user selection, update the user interface to include an asset interface including one or more of a subset of diagnostic parameters associated with the first asset, a selectable link to detailed diagnostic data regarding the first asset, a run status visualization indicating historical operational status of the first asset, and/or an upcoming maintenance visualization indicating an expected next maintenance date.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit or digits in a reference number typically refer to the figure number in which that element is first introduced.

FIGS. 4A and 4B depict example graphical user interfaces displaying asset data of an organization's assets, according to some embodiments.

FIGS. 5A-5D depict example graphical user interfaces displaying asset data relating to a particular asset, according to some embodiments.

FIGS. 6A and 6B depict example user interfaces for customizing the asset data shown on a unified platform, according to some embodiments.

DETAILED DESCRIPTION

Figure 1A:
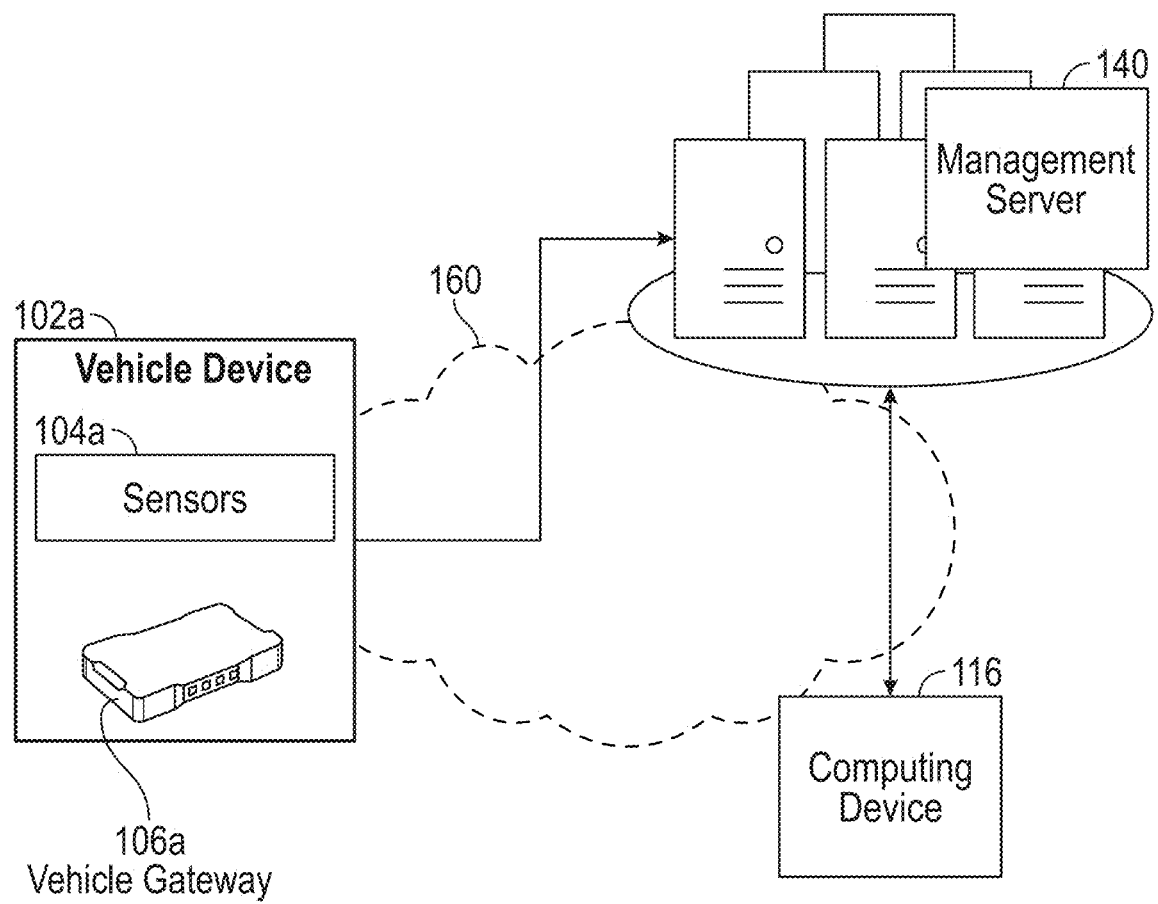
FIG. 1A is a block diagram depicting illustrative data flows and interactions between a vehicle device, a management server, and a computing device according to some embodiments.

Generally described, the present disclosure relates to a unified platform for asset monitoring. Organizations that have certain "assets" (such as vehicles, trailers, heavy industrial equipment, unpowered equipment, and/or any other physical objects) may routinely monitor and maintain these assets. To achieve such monitoring, hardware devices may be coupled to these assets to collect and report diagnostic data regarding the assets. For example, an industrial device may include an industrial gateway coupled to industrial equipment, such as a tractor or crane, and configured to gather large amounts of information regarding the equipment's location, utilization, and maintenance status. However, when an organization has numerous assets and/or numerous types of assets (e.g., vehicles, trailers, industrial device, equipment, etc.), it may be difficult to keep track of, organize, and report the relevant data for each of these different types of assets. The organization may need to expend time and resources on configuration and administration of the collected data, which may be provided in separate user interfaces for each type of data.

Aspects of the present disclosure address the issues noted above, among others, by providing a unified platform for asset monitoring. Such a unified platform may consolidate the data collected by the various gateways, filter out the irrelevant data, and report or display the relevant data in a manner that is helpful to the organization. Beneficially, such a unified platform provides a single central location for the organization's data administrators to review the relevant asset data. Furthermore, having a single central location reduces overhead associated with configuration of reports for each asset or type of asset.

Various aspects of the disclosure will be described with regard to certain examples and embodiments, which are intended to illustrate but not limit the disclosure. Although aspects of some embodiments described in the disclosure will focus, for the purpose of illustration, on particular examples of asset gateways (e.g., vehicle, trailer, industrial, and/or equipment gateways), unified platforms, and graphical user interfaces, the examples are illustrative only and are not intended to be limiting. Any feature used in any embodiment described herein may be used in any combination with any other feature, without limitation.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Management Server (also referred to as a "backend server system," "backend," "cloud," or "cloud server"): one or more network-accessible servers configured to communicated with vehicle devices (e.g., via a vehicle gateway and/or communication circuitry of a dashcam). A management server is typically configured to communicate with multiple vehicle devices, such as each of a fleet of hundreds, thousands, or more vehicles. Thus, the management server may have context and perspective that individual vehicle devices do not have. For example, the management server may include data associated with a large quantity of vehicles, such as vehicles across a fleet, multiple fleets, and/or within a geographic area. Thus, the management server may perform analysis of asset data across multiple vehicles and between groups of vehicles (e.g., comparison of fleets operated by different entities). A management may also include a feedback system that periodically updates event models used by vehicle devices to provide real-time detection of events, such as safety events, that may trigger in-vehicle alerts. For example, when the backend server has optimized an event model based on analysis of asset data associated with many safety events, potentially across multiple fleets of vehicles, an updated event model may be sent to the vehicle devices.

Asset: Any physical object. An asset may include a vehicle, trailer, industrial device, equipment, and/or any other object.

Asset Device: one or more electronic components positioned in or on an asset and configured to communicate with a management server (also referred to as a "backend" or "cloud") via a gateway. An asset device may include one or more sensors, such as one or more video sensors, audio sensors, accelerometers, global positioning systems (GPS), and the like, which may be housed in a single enclosure (e.g., a dashcam) or multiple enclosures. An asset device may include a single enclosure (e.g., a dashcam) that houses multiple sensors as well as communication circuitry configured to transmit sensor data to a management server. Alternatively, an asset device may include multiple enclosures positioned at different locations on the asset.

Asset Gateway (or "Gateway"): a device positioned in or on an asset, which is configured to communicate with one or more sensors. In some embodiments, an asset gateway can be coupled to an asset. For example, a vehicle gateway may be coupled (via a wired and/or wireless connection) to an on-board diagnostic (OBD) port of the vehicle. An asset gateway may include short-range communication circuitry, such as near field communication ("NFC"), Bluetooth ("BT"), Bluetooth Low Engergy ("BLE"), etc., for communicating with sensors in or on the asset and/or other devices that are in proximity to the asset. An asset gateway further includes communication circuitry configured to communicate with a management server.

Sensor Data: any data obtained by the asset device, such as video, audio, accelerometer, global positioning systems (GPS), any information obtained via the OBD (or similar) port of an asset, and/or any metadata associated with the asset device.

Data Store: any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory, etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Asset Monitoring System and Unified Platform

FIG. 1A is a block diagram of an illustrative network environment depicting data flows and interactions between one or more asset devices (such as a vehicle device 102a), a management server 140, and one or more computing devices 116 according to some embodiments. A vehicle device 102a may acquire asset data, such as diagnostic data, using sensors attached to the vehicle (e.g., a sensor coupled to an OBD port of the vehicle, as described above). The vehicle device 102a may transmit the asset data to a management server 140. The vehicle device 102a may communicate with the management server 140 through a communication network 160. The management server 140 may then transmit the asset data to a remote computing device 116 (such as a user device accessing an asset monitoring application) through the communication network 160, such as by providing a dashboard for visualization of portions of the data. In some embodiments, the vehicle device 102a may be configured to communicate directly with the computing device 116, such as by transmitting asset data to the computing device 116 through a communication network 160.

In some embodiments, a communication network (also referred to simply as a "network") may be a publicly-accessible network of linked networks, possibly operated by various distinct organizations, such as the Internet. In some cases, the network may be or include a private network, personal area network, local area network, wide area network, global area network, cable network, satellite network, cellular data network, etc., or some combination thereof, some or all of which may or may not have access to and/or from the Internet.

Figure 1B:
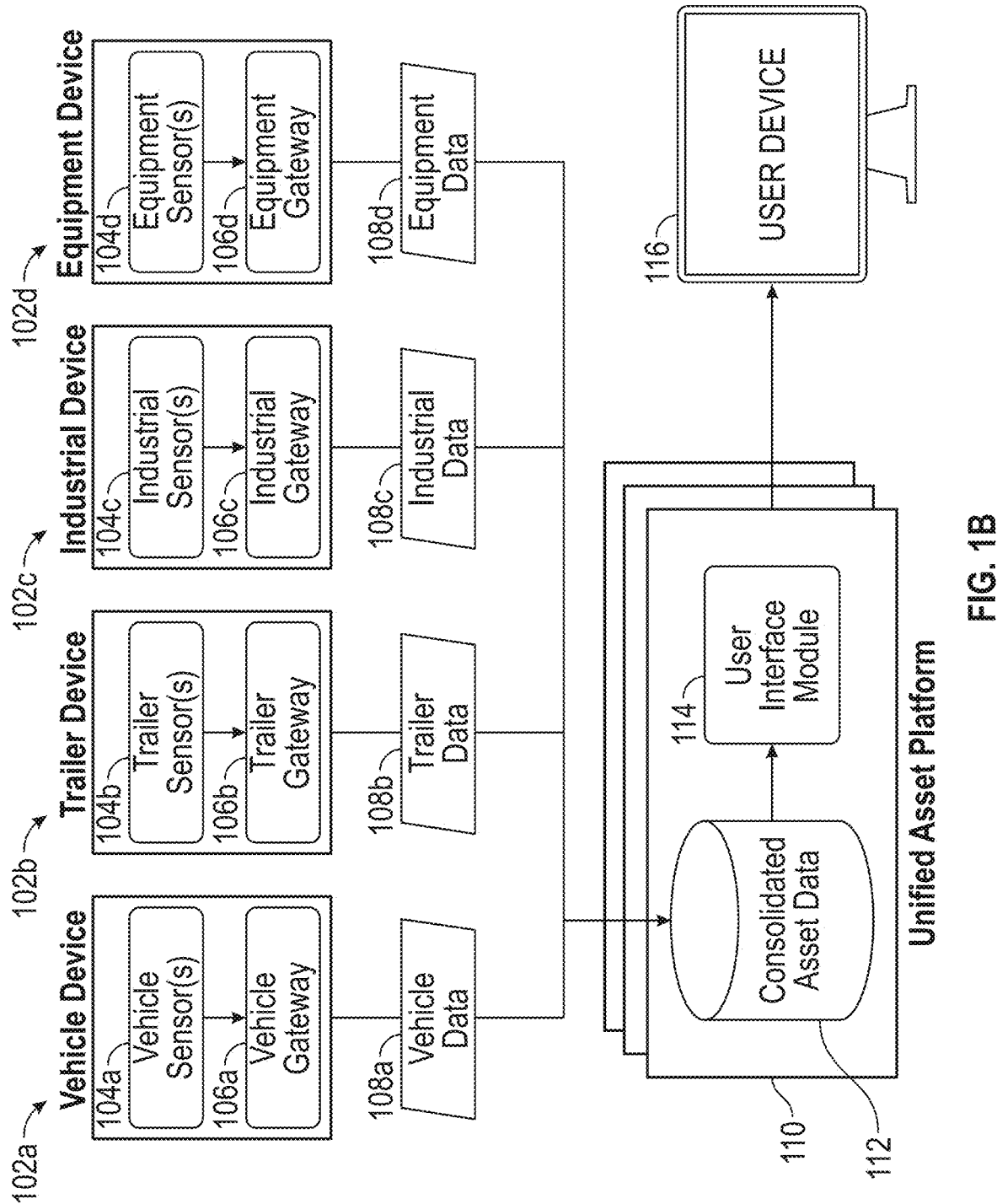
FIG. 1B is a block diagram depicting illustrative data flows and interactions between various asset devices, a unified platform for data visualization, and a user device according to some embodiments.

The illustrative interactions depicted in FIG. 1A are applicable to asset devices coupled to other types of assets besides vehicles, such as trailers, industrial equipment, and light or unpowered equipment (as illustrated in FIG. 1B). For example, a trailer device, industrial device, equipment device, etc., may communicate with the management server 140 in the same or similar manner as discussed with reference to the vehicle device 102a.

FIG. 1B illustrates an example asset monitoring system comprising various asset devices and a unified platform for displaying various types of asset data to an end user. In some embodiments, as illustrated in FIG. 1B, the asset monitoring system comprises asset devices of different types (collectively referred to herein as "the asset devices 102"), such as one or more vehicle devices 102a coupled to vehicles, one or more trailer devices 102b coupled to trailers, one or more industrial devices 102c coupled to industrial equipment, and/or one or more equipment devices 102d coupled to unpowered equipment.

The various asset devices 102 are each coupled to a corresponding asset. For example, a vehicle device 102a may be coupled to a vehicle, a trailer device 102b may be coupled to a trailer, an industrial device 102c may be coupled to industrial equipment, and an equipment device 102d may be coupled to light or unpowered equipment.

The asset devices 102 may comprise sensors 104 configured to acquire asset data 108. The asset gateways 106 may acquire or otherwise access the asset data 108 and communicate the asset data 108 to the unified asset platform 110. In some embodiments, the asset devices 102 may comprise the same hardware regardless of asset type. In other embodiments, the asset devices 102 may differ based on asset type; for example, a vehicle device 102a may comprise different sensors from a trailer device 102b, and the hardware or software of a vehicle gateway 106a may differ from that of a trailer gateway 106b.

In the example of FIG. 1B, each of the asset gateways 106 transmits the corresponding asset data 108 to a unified asset platform 110, comprising a data store for storing the various asset data from different asset devices as consolidated asset data 112. In some embodiments, the unified asset platform 110 may be part of a management server, such as the management server 140 of FIG. 1A. The consolidated asset data 112 may include asset data 108 acquired by different types of asset devices 108. In various embodiments, the consolidated asset data 112 may be stored in a database, as described above. For example, in some embodiments, the consolidated asset data 112 may be stored in a relational database including a plurality of asset objects and various properties associated with each asset object.

In other embodiments, the unified asset platform 110 may not include a data store for storing consolidated asset data 112 but may instead ingest asset data from an external (to the unified asset platform) data store before generating a user interface using the user interface module 114.

In some embodiments, the asset devices 102 may transmit the asset data 108 to the unified asset platform 110 in real time as data is acquired by sensors 104. In other embodiments, the transmission of asset data 108 may occur at a later time, such as a batch transmission at a designated time daily, or upon request by the unified asset platform 110.

The unified asset platform 110 may further comprise a user interface module 114 that includes computing logic to generate interactive user interfaces of a unified asset platform, such as displaying portions of the consolidated asset data 112 on a user device 116. Example user interfaces are described in greater detail below.

Example Asset Gateway

Figure 2A:
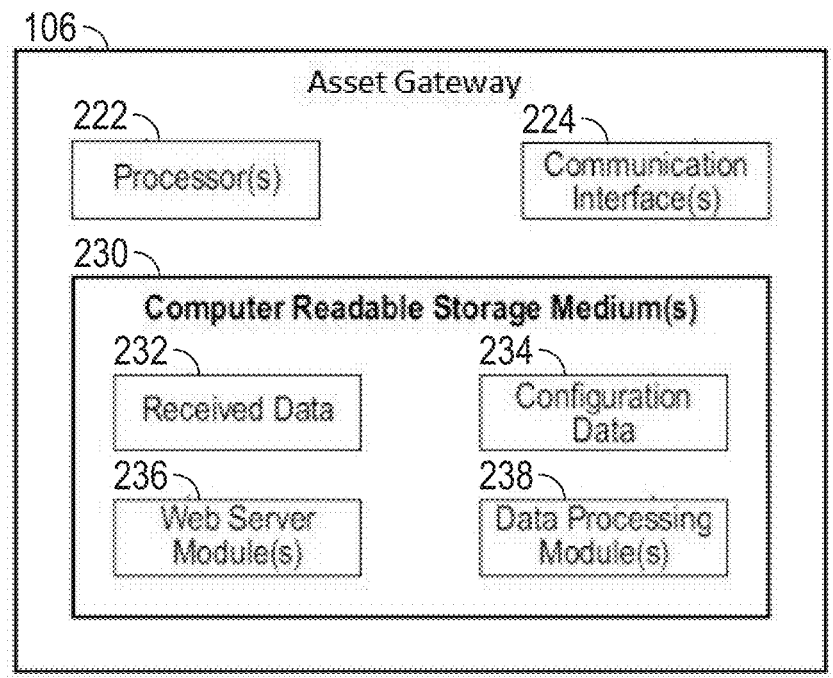
FIGS. 2A and 2B depict an example asset gateway according to some embodiments.

FIG. 2A illustrates a block diagram of an example asset gateway 106, according to various embodiments of the present disclosure. Asset gateway 106 may comprise one or more processors 222, one or more communication interfaces 224, and one or more computer readable storage mediums 230, each of which may be in communication with one another. The computer readable storage medium(s) 230 may include received data 232, configuration data 234, web server module(s) 236, and data processing module(s) 238. The received data 232 and the configuration data 234 may be stored in one or more databases of the asset gateway 106. In various implementations one or more buses, interconnects, wires/cables, etc. may be used to interconnect the various components of the asset gateway 106.

In operation, the one or more communication interfaces 224, one or more processors 222, and one or more computer readable storage mediums 230 communicate with one another to, e.g., execute by the processor(s) 222 computer program instructions (e.g., as provided by the configuration data 234, the web server module(s) 236, and/or the data processing module(s) 238); receive, access, and transmit data (e.g., to/from the received data 232 and/or configuration data 234, and via the communication interface(s) 224); and/or the like. Further implementation details are described below.

In operation, the communication interface(s) 224 may provide wired and/or wireless communications with other devices and networks, as described herein. In various embodiments, communications among the various components of an asset monitoring system may be accomplished via any suitable means. For example, the asset gateway(s) 106 may communicate with one another, the management server 140, and/or the computing device(s) 116 via the network 160, such as via Bluetooth, WiFi, infrared, cellular, etc. communication technology. Accordingly, the communications interface(s) 224 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 224 may further include, for example, serial inputs/outputs, digital inputs/output, analog inputs/outputs, and the like. As noted herein, the communications interface(s) 224 may further include one or more application programming interfaces ("APIs").

In operation, the received data 232 includes any operational data, analysis data or results, or data received from the various sensors 104 by the asset gateway 106, e.g., via the various input/output ports of the asset gateway 106. Such received data 232 may include data processed by the asset gateway 106 (e.g., via the data processing module(s) 238).

In operation, the configuration data 234 includes one or more configurations that configure operation of the asset gateway 106. For example, such configurations may be received from a user (and/or other devices in communication with the asset gateway 106), and may include various communications specifications (e.g., that indicate functionality of the input and output ports), executable program instructions/code, algorithms or processes for processing the received data, and/or the like. The asset gateway 106 may store multiple configurations in the configuration data 234, which may be selectively run or implemented, e.g., via user selection via the management server 140 and/or the computing device(s) 116.

In operation, the web server module(s) 236 may include program code executable, e.g., by the processor(s) 222 to provide a web-based access (e.g., interactive graphical user interfaces accessible via web-based communications protocols, rendering of interactive graphical user interfaces written in web-based languages by web-based browsers, etc.) to the asset gateway 106, e.g., to configure the asset gateway 106 and/or access data of the asset gateway 106. Such web-based access may be via one or more communications protocols, e.g., TCP/IP, UDP, WebRTC, etc., and may include one or more secure communications/cryptographic protocols, e.g., TLS, SSL, etc., and may further be provided via communications interface(s) 224. This may include, for example, generating user interface data useable for rendering the various interactive user interfaces described. The user interface data may be used by various computer systems, devices, and/or software programs (for example, a browser program of a computing device 116), to render the interactive user interfaces. The interactive user interfaces may be displayed on, for example, electronic displays (including, for example, touch-enabled displays). In various implementations the management server 140 and/or computing device(s) 116 may communicate with the controller device 150 via one or more of the web server module(s) 236.

In operation, the data processing module(s) 238 may provide processing and analysis of received data, as described herein. The type of processing and analysis may be provided by the configuration data 234, and may result in one or more outputs from the asset gateway 106 that may be provided via the communications interface(s) 224, as further described herein. In various implementations, the data processing module(s) 238 may be executed by the processor(s) 222, which processor(s) 222 may include various types of processors including special purposes processors, e.g., Graphics Processing Units ("GPUs"), Application Specific Integrated Circuits ("ASICs"), Field-Programmable Gate Arrays ("FPGAs"), and/or the like.

As described herein, received data, analysis results, and/or configuration data may be communicated, e.g., via the communications interface(s) 224, to other devices, such as the management server 140 and/or computing device(s) 116. For example, the asset gateway 106 may be configured to reliably and securely offload data and to transmit the data to the management server 140 regardless of whether the connectivity of the asset gateway 106 (e.g., to the management server 140) is intermittent. For example, data may be stored by the asset gateway 106 until connectivity is available, and may then transmit the data to the management server 140.

In various implementations, as described above, the asset gateway 106 may communicate with one or more computing devices 116. Communications with computing device(s) 116 may be via direct (e.g., not via a network) wired and/or wireless communications, and/or may be via a network (e.g., a local network) wired and/or wireless communications. Via communications with the computing device(s) 116, users may configure and/or monitor status of the asset gateway 106. As described herein, the asset gateway 106 may advantageously communicate with the computing device(s) 116 via the web server module(s) 236.

In various embodiments, the asset gateway 106, may include various other modules, components, engines, etc. to provide the functionality as described herein. It will be appreciated that additional components, not shown, may also be part of the asset gateway 106, and, in certain embodiments, fewer components than that shown in FIG. 2A may also be used in the asset gateway 106.

In various embodiments, firmware of the asset gateway 106 may be updated such that the asset gateway 106 may provide additional functionality. Such firmware updating may be accomplished, e.g., via communications with the management server 140, thereby enabling updating of multiple asset gateways 106 remotely and centrally. Additional functionality may include, for example, additional communications specifications, additional ways of communicating with other devices (e.g., additional control languages, etc.), additional configurations or options for configurations, and/or the like.

Figure 2B:
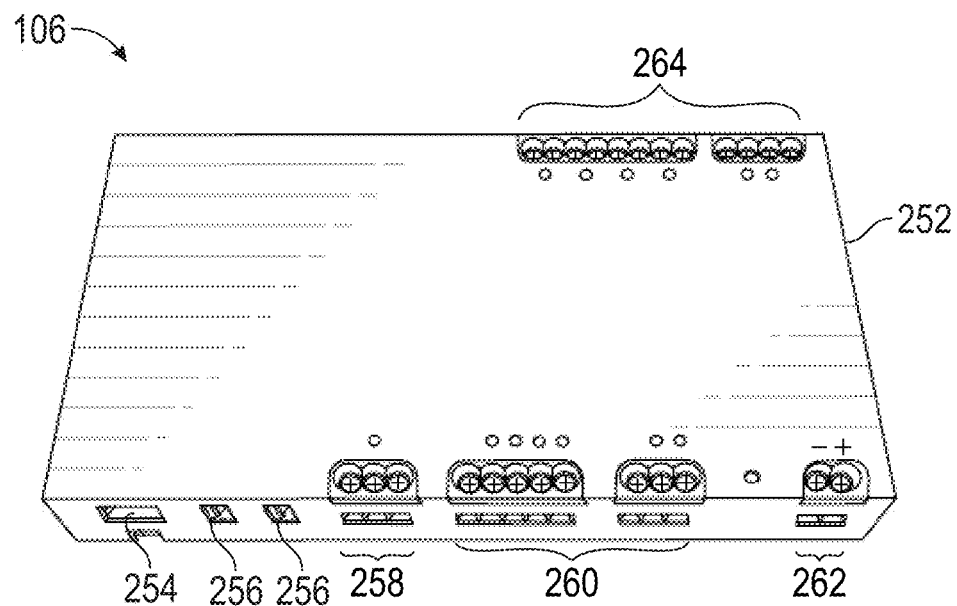

FIG. 2B is a front perspective view of an example asset gateway 106. As described herein, while the embodiment described in reference to FIG. 2B shows one example implementation of the asset gateway 106, other implementations are contemplated, including implementations that place the various communications interfaces 224 in different locations, or that include more or fewer communications interfaces 224, etc. In various implementations, the asset gateway 106 may support scalable expansion input/output ("I/O") modules for higher density applications.

As shown, the asset gateway 106 may include a housing 252, which may be made of metal (e.g., aluminum, stainless steel, etc.), plastic (e.g., UV-stabilized polycarbonate, etc.), and/or any other suitable material or combination of materials. The housing 252 may include various ports/connectors (e.g., communications interfaces 224), e.g., for interfacing with other device(s). For example, the asset gateway 106 may include an Ethernet port 254, one or more USB ports 256, serial I/O ports 258 (e.g., RS232, RS485, and/or the like), digital I/O ports 260 (which may include counters), and analog I/O ports 264. The asset gateway 106 may further include power ports 262.

In an implementation, the serial I/O ports 258 are ESD protected, and support RS485 (up to 20 Mbps, 2-wire, half-duplex), RS232 (up to 1 Mbps, 2-wire, full or half-duplex), and various serial protocols (e.g., Modbus slave/master). Various other implementations and specifications of the serial I/O ports 258 are contemplated.

In an implementation, the digital I/O ports 260 may include six pins, each being configurable as input or outputs (open-drain), with ESD/EFT/Surge protection. As inputs, the digital I/O ports 260 may provide dry-contact (internally sourced 3.3V @ 1 mA) or wet-contact (0-30V). As outputs, the digital I/O ports 260 may provide sinking MOSFET outputs, rated 30V, 0.5 A. In an implementation, the digital I/O ports 260 may include two counter inputs with 0-30V, and up to 10 Hz (dry-contact) or up to 10 kHz (wet-contact). Various other implementations and specifications of the digital I/O ports 260 are contemplated.

In an implementation, the analog inputs may include four isolated channels with 0-12 V or 0-24 mA, with a 14-bit ADC resolution, with an accuracy of 0.1% FSR at 25 C, with ESD/EFT/Surge protection, and with an input resistance at 24 mA of 300 ohm. In an implementation, the analog outputs may include two isolated channels with 0-12 V or 0-24 mA, with a 16-bit resolution, with an accuracy of +/−0.2% FSR at 25 C, with ESD/EFT/Surge protection, with a settling time of 5 μs, and with a load range of 1000 ohm (12V)-600 ohm (20 mA). Various other implementations and specifications of the analog I/O ports 264 are contemplated.

In an implementation, the power ports 262 and the asset gateway 106 may support 10-28 Vdc, and may have a maximum power draw of 10.8 W @ 12V without analog outputs, and 20 W @ 12V with analog inputs. Various other implementations and specifications of the power ports 262 and power characteristics of the asset gateway 106 are contemplated. In various embodiments, the asset gateway 106 may include a power supply internal to the housing 252, or external to the housing 252, which may provide power to the asset gateway 106.

In an implementation, the asset gateway 106 has general dimensions of 180 mm×118 mm×32 mm. In alternative implementations the asset gateway 106 may have different dimensions. In an implementation, the asset gateway 106 housing is rated IP67 under IEC standard 60529. In an implementation, the asset gateway 106 may be certified for hazardous locations Class 1, Division 2, Groups A, B, C, and D (as defined by the National Electric Code ("NEC") in Articles 500 to 506). In various implementations the asset gateway 106 may have other ratings, certifications, or classifications.

As described herein, advantageously the functionality of the various I/O ports of the asset gateway 106 may be configured to particular applications, and may be re-configured as needed, via centralized communication with the management server 140.

Example Method for Displaying Asset Data Using a Unified Asset Platform

Figure 3:
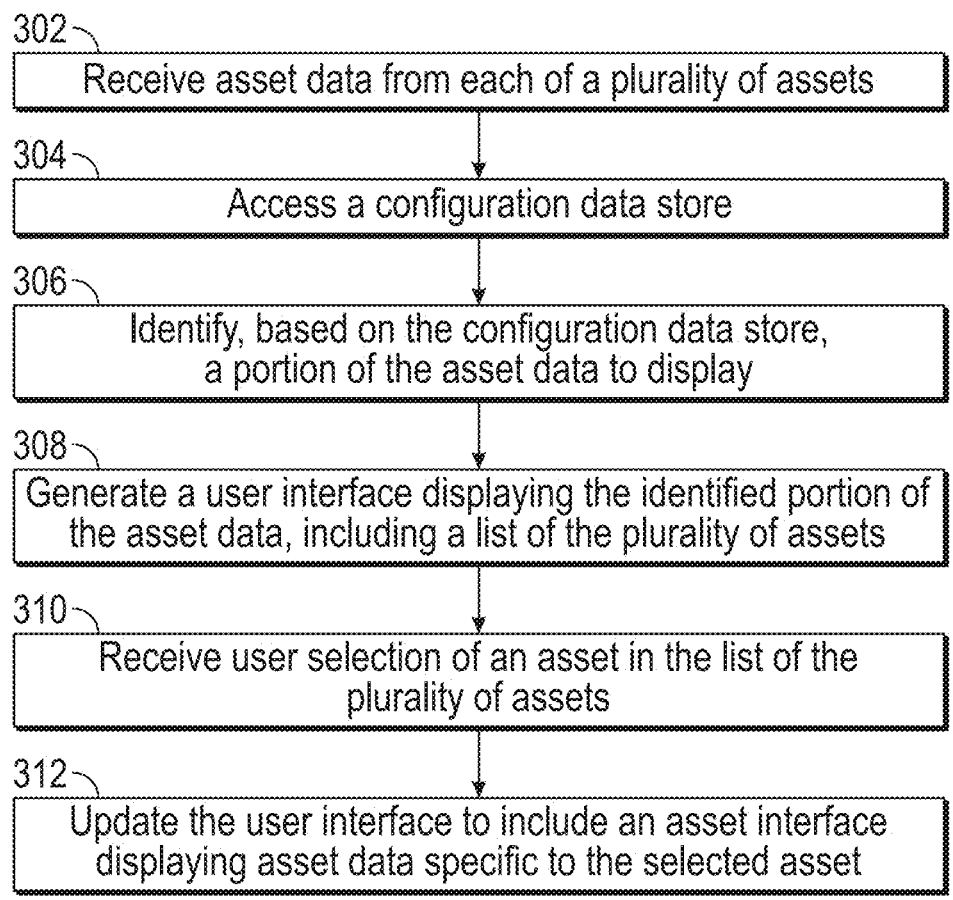
FIG. 3 is a flowchart illustrating an example method for displaying asset data on a unified platform according to some embodiments.

FIG. 3 is a flowchart illustrating example methods and functionality, according to various embodiments of the present disclosure. FIG. 3 illustrates example functionality that may be provided by, for example, a management server 140, such as to provide a unified asset platform. For illustrative purposes only, the example functionality will be described as provided by a unified asset platform 110, in conjunction with a computing device 116, such as a user device. In various embodiments, the unified asset platform 110 may be a part of or separate from a management server 140 that provides a part or all of the example functionality.

At block 302, a unified asset platform 110 receives asset data from each of a plurality of assets. As described above, the asset data may have been acquired by asset devices 102, each coupled to one of the plurality of assets. The asset data may include, for example, diagnostic engine data, utilization data, location data, maintenance data, and/or any other data associated with corresponding assets.

At block 304, the unified asset platform 110 accesses a configuration data store. The configuration data store may be stored internally within the unified asset platform 110, or may be stored external to the unified asset platform 110 on the management server 140. The configuration data store may store configuration data indicating a portion of the received asset data to display to a user, such as based on system or user specific preferences for different types of assets. For example, the configuration data store may store configuration data indicating specific types of asset data, such as certain diagnostics, to display to a user. In some embodiments, the configuration data may indicate different portions of the asset data depending on asset attributes, such as an asset identifier or an asset type. For example, the configuration data may indicate diagnostics 1 and 2 for vehicles and diagnostics 3 and 4 for industrial equipment. Alternatively, the configuration data may be more granular, indicating different portions of the asset data even for specific assets of the same type.

At block 306, the unified asset platform 110 identifies, based on the configuration data store, a portion of the asset data to provide as part of a unified asset platform provided to the user computing device.

At block 308, the unified asset platform 110 generates one or more user interfaces of the unified asset platform including portions of the asset data identified at block 306. The unified asset platform may generate the user interfaces using a user interface module 114, which may comprise logic for generating such a user interfaces. The user interfaces may be displayed on a computing device 116, such as a user device. The user interfaces may include information regarding all or some subset of the plurality of assets, such as a list of all assets (of various types). Example user interfaces will be described in greater detail below. In some embodiments, the unified asset platform may generate the user interfaces based on user interface configuration data found in a configuration data store.

At block 310, the unified asset platform 110 receives user selection of an asset in a list of the plurality of assets. For example, the unified asset platform 110 may receive user selection of a specific vehicle asset. The selection may be received via user input on a user device displaying the user interface generated at block 308.

At block 312, the unified asset platform 110 updates the user interface to include an asset interface displaying asset data specific to the selected asset. As described above, the asset interface may be generated based on user interface configuration data found in a configuration data store. The asset interface may also display a portion of the asset data based on configuration data in a configuration data store.

Example Interactive Graphical User Interfaces

As described herein, various interactive graphical user interfaces may be provided such that a remote user may view asset data associated with a plurality of assets. FIGS. 4A-4B, 5A-5D, and 6A-6B illustrate example interactive graphical user interfaces that may be provided as part of a unified asset platform, according to various embodiments. These example user interfaces are provided for illustrative purposes to show various functionalities of the system. In other implementations, the interactive graphical user interfaces may include more or fewer elements, may be arranged differently, and/or may be combined or divided. As described above, the various example user interfaces may be generated/provided by a user interface module 114 of a unified asset platform 110, and/or another service or module of the system.

Figure 4A:
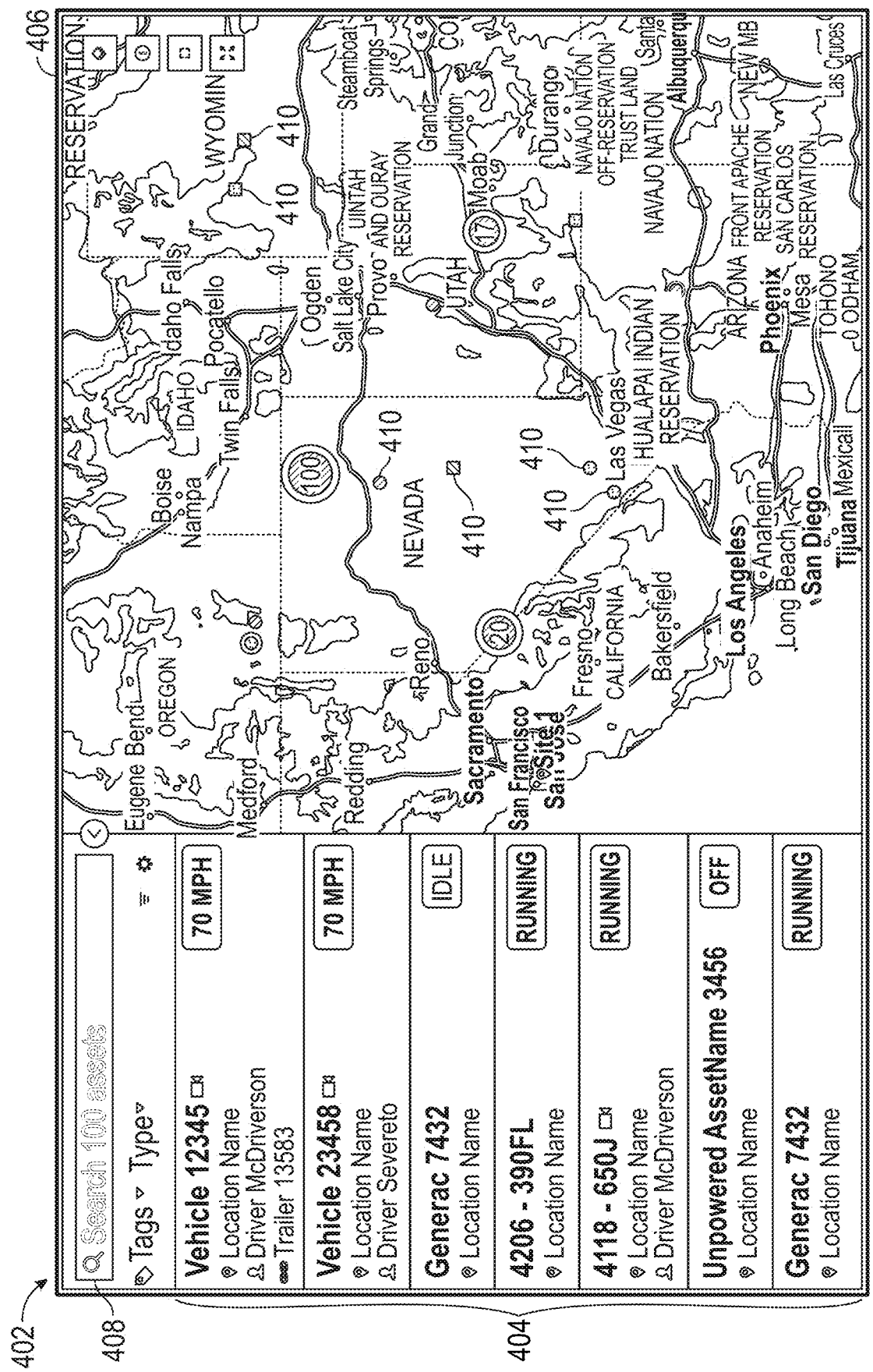

FIGS. 4A and 4B illustrate example interactive graphical user interfaces displaying asset data associated with a plurality of assets of various types, according to one or more embodiments. Referring to FIG. 4A, a user interface 402 includes an asset overview panel 404 and a geographic map 406. The listing of assets 404 includes, for each of the listed assets, various asset details (e.g., as may be acquired by an asset device and as may be included in properties of asset objects in a database) including title/identifier, asset type, location, driver, status, and tags. Via the user interface 402, a user may search for and/or filter the various assets in the asset overview panel 404 via search and filter tools 408. In some embodiments, the assets listed in the asset overview panel 404 may include all assets coupled with corresponding asset devices; in other embodiments, the listing of assets may include only a subset of assets (e.g., those configured to be displayed by an organization or user).

The example geographic map 406 includes asset icons 410 representing various assets in the asset overview panel 404. The asset icons 410 may indicate the geographic location of various assets on the geographic map 406. In some embodiments, the asset icons 410 may indicate various asset details. For example, the shape of an asset icon may indicate an asset's type (e.g., vehicle, trailer, industrial equipment, etc.) and the color of an asset icon may indicate an asset's status (running, idle, off, etc.).

Referring to FIG. 4B, a user interface 412 includes a listing of assets 414. The listing of assets 414 includes, for each of the listed assets, various asset details, such as asset name, asset type, location/geofence, running status, utilization, total engine hours, the time that maintenance is due on the asset, and any outstanding issues (e.g., as may be indicated by various icons, as illustrated in FIG. 4B). Via the user interface 412, a user may search for and/or filter the various assets in the listing of assets 414 via search and filter tools 416. The search and filter tools 416 may include a tab for each asset type as well as for all asset types, which a user may use to filter the listing of assets 414 by asset type.

The example user interfaces illustrated in FIGS. 4A and 4B may, in various embodiments, be displayed to a user together or separately. For example, in some embodiments, when a user interface is initially provided by a user interface module 114 (e.g., as described in block 308 of FIG. 3), the user interface may include both user interfaces 402 and 412 (e.g., with user interface 402 positioned above user interface 412).

Figure 5B:
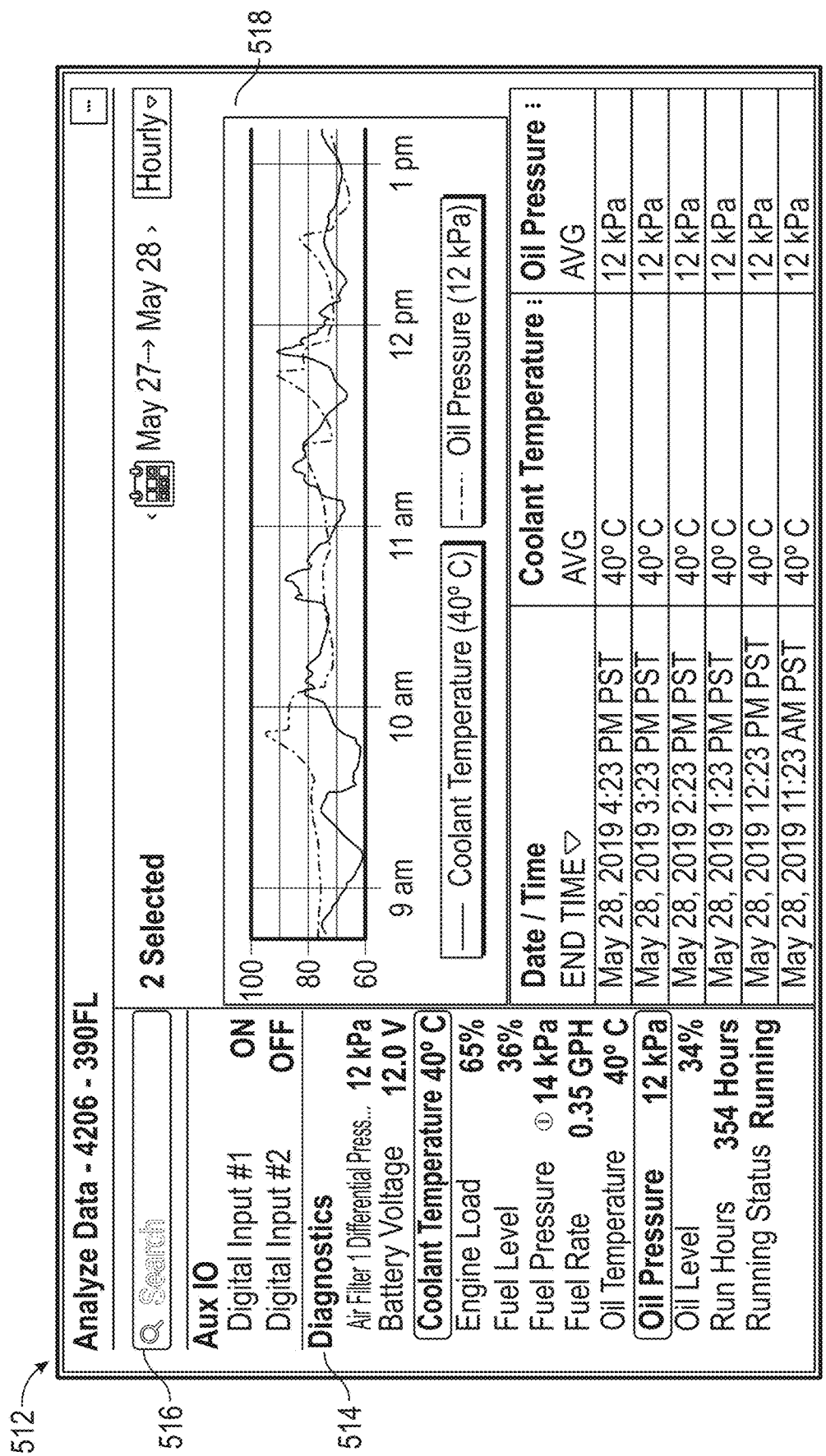

FIGS. 5A-5D illustrate example interactive graphical user interfaces displaying asset data associated with an asset, according to one or more embodiments. Referring to FIG. 5A, a user interface 502 displays various asset data associated with a particular asset. In various embodiments, the user interface 502 may follow user interfaces 402 and/or 412 (e.g., when a user has selected one of the listed assets in the listing of assets 404 and/or 414).

In this example, user interface 502 includes an asset overview 504, diagnostic data panel 506, and data visualization panel 508. The asset overview 504 displays general information regarding the asset, including an identifier, an asset type, a location, any alerts associated with the asset, high-level diagnostic data, and information regarding the asset gateway coupled to the asset. The diagnostic data panel 506 displays certain diagnostics associated with the asset. In some embodiments, the specific diagnostics displayed in the diagnostic data panel 506 may be configured by a user. In other embodiments, the displayed diagnostics may be determined by the system, such as by displaying the diagnostics that are most commonly used/viewed, or by displaying the diagnostics that are most relevant to the asset type. In this example, the diagnostic data panel 506 also includes an "Analyze Data" button 510, which may be selected by a user to navigate to a separate user interface providing more detailed diagnostic data. The data visualization panel 508 includes a geographic map displaying the asset's precise location and various graphical display elements for visualizing asset data. The data visualization panel 508 also includes an "Analyze Data" button 510 and an interactive user control enabling a user to customize a time period associated with the asset data being displayed.

In various implementations, the data visualization panel 508 may include one or more graphical display elements enabling a user to visualize asset data associated with a specific asset. For example, in the implementation illustrated in FIG. 5A, the data visualization panel 508 includes a run status visualization 520 that shows run status of the asset over a period of time, such as a week, month, lifetime, etc. In the example of FIG. 5A, the run status visualization 520 includes several vertical bars each representing a particular day of the week. For each vertical bar in run status visualization 520, a portion of the bar is highlighted, representing that the asset had a particular run status (e.g., "running") for a time period represented by the highlighted portion of the bar. For example, the vertical bar labeled "W" may represent Wednesday and the highlighted portion of the bar may indicate that the asset was "running" from about 6 am-1 pm. In some implementations, users may be enabled to customize run statuses and criteria for determining different run statuses, such as running, idle, inoperative, etc. For example, a particular organization or user may define a "running" status as requiring an engine to not only be powered on, but also running at more than a threshold RPMs, while when the engine is running at below the threshold RPMs the status may be "idle." In some embodiments, the run status visualization may include multiple run statuses, such as "running" status in green, "idle" status in yellow, and "off" status as red.

The example data visualization panel 508 also includes an upcoming maintenance visualization 522 which comprises a circular indicator of a time period until the next expected maintenance date. For example, the circle (or donut-shaped) visualization 524 may represent a time period, such as 12 hours, 24 hours, 2 days, 3 days, 5 days, two weeks, etc., and a shaded portion 523 indicates a time period remaining until maintenance is required. In the example of FIG. 5A, the entire circle 524 represents a time period of 12 hours and the shaded portion 523 represents time remaining until maintenance (11 hours in this example). In some implementations, the circular indicator may change (e.g., by changing to a different color) as the next expected maintenance date passes a threshold (e.g., within 6 hours of the expected maintenance time). The time period represented by the visualization may dynamically adjust based on the time to maintenance. For example, a user viewing the visualization when time to maintenance of the asset is 10 days may be presented with a maintenance visualization representing a time period of 2 week (14 days), and when a user views information for the same assets 9 days later (e.g., less than 24 hours until the maintenance time), the time period may be adjusted to 24 hours.

Referring to FIG. 5B, the example user interface 512 may be provided, for example, in response to user selection of the "Analyze Data" button 510 in the user interface 502. Details related to the specific asset are then displayed in the user interface 512 in response to the user's selection. In this example, the details include auxiliary input/output information, diagnostic data, and/or or more visualization of certain asset data. The auxiliary and diagnostic information may be searched using a search bar 516. Furthermore, specific diagnostics may be selected by the user to be visualized in section 518, which includes a graph and time log displaying changes to the selected diagnostics over time. Section 518 further includes interactive user controls enabling a user to adjust the period of time associated with the graph and time log. For example, as illustrated in FIG. 5B, a user may select the "Coolant Temperature" and "Oil Pressure" diagnostics in section 514 and a time period of "May 27 to 28" and a time increment of "Hourly" in section 518. As a result, the graph and time log in section 518 will display changes to the asset's coolant temperature and oil pressure over hourly increments from the time period from May 27 to May 28.

Referring to FIG. 5C, a user interface 522 displays maintenance data, including a listing of maintenance items 524, associated with a specific asset. The user interface 522 may be provided in response to user selection of a particular asset from another user interface. The listing of maintenance items 524 includes the type of maintenance item, engine hours, when maintenance is scheduled, and the maintenance status. The listing of maintenance items 524 further includes interactive user controls which enable a user to resolve an open maintenance item or to delay (or "snooze") a maintenance item for a duration of time. Via the user interface 522, a user may search for and/or filter the various maintenance items in the listing of maintenance items 524 via search and filter tools 526. The search and filter tools 526 may enable a user to filter the listing of maintenance items 524 by time or status. Furthermore, the user interface 522 may display alerts 528 associated with a specific maintenance item. In some embodiments, the content of the alerts 528, and when the alerts 528 are displayed, may be configured by a user. The alerts 528 may also include an interactive user control enabling users to schedule maintenance associated with an alerted maintenance item.

Figure 5D:
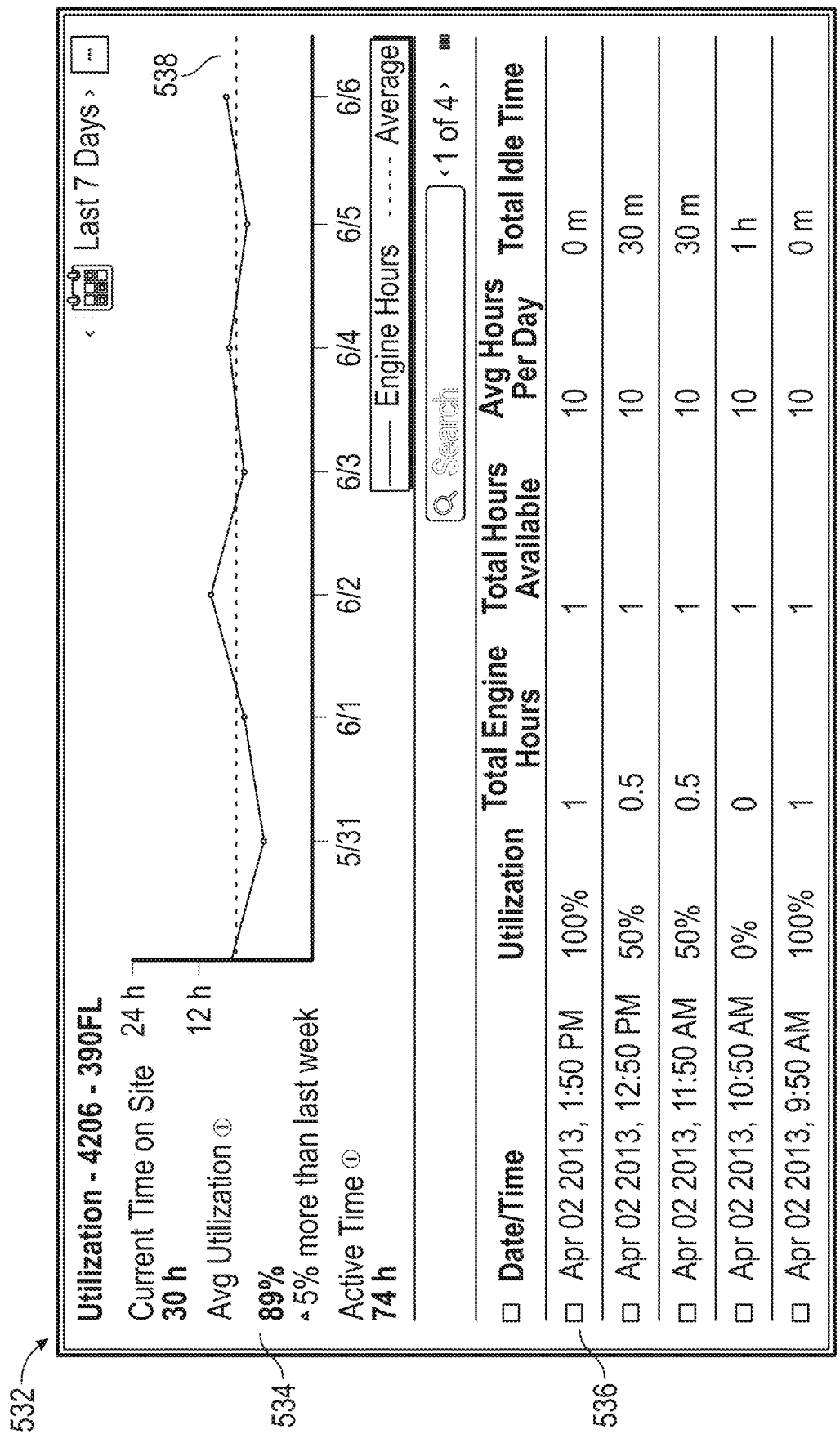

Referring to FIG. 5D, a user interface 532 displays utilization data associated with a specific asset. The user interface 532 includes a section 534 displaying general utilization information associated with the asset. Section 534 includes a graph 538 displaying utilization data associated with the asset over a specific period of time (e.g., the last 7 days). For example, as illustrated in FIG. 5D, the graph 538 may chart the total engine hours logged by the asset on each day for the last 7 days. The graph 538 may also chart the average daily engine hours over the last 7 days. The user interface 532 further includes a utilization time log 536. The utilization time log 536 includes utilization data associated with the specific asset for a specific time period, including the date/time, utilization percentage, total engine hours, total available hours, average hours per day, and total idle time.

FIGS. 6A and 6B illustrate example interactive graphical user interfaces directed towards asset data configuration, according to one or more embodiments. Referring to FIG. 6A, a user interface 602 includes a listing of assets 604. The listing of assets 604 includes, for each listed asset, an asset name, asset type, the number of enabled diagnostics for the asset, and the number of "favorited" diagnostics for the asset. The listing of assets 604 also includes a "Configure" button 606 which may be selected by a user to configure the enabled diagnostics for an asset. The listing of assets 604 also includes, for each asset, a checkbox enabling a user to select one or more assets to configure diagnostics for. A user may search for and/or filter the various assets in the listing of assets 604 via search and filter tools 608. The search and filter tools 608 may enable a user to filter the listing of assets 524 by tags, attributes, or geofence/location.

FIG. 6B illustrates user interface 602 following selection of a "Configure" button 606 by a user. The user interface 602 includes a listing of diagnostics 610. The listing of diagnostics 610 may be searched and includes, for each listed diagnostic, a checkbox enabling a user to select one or more diagnostics to configure for the previously selected assets. For example, as illustrated in FIG. 6B, a user may select 6 assets to configure diagnostics for. Via the listing of diagnostics 610, the user may then select one or more diagnostics to associate with the selected 6 assets. The user may then save the configuration of the selected one or more diagnostics for the selected assets using a "Save" button 612. As a result, the selected diagnostics will be "enabled" for the selected assets; these diagnostics may be included in the asset diagnostic data displayed, e.g., on user interfaces 502, 512, 522, and/or 532.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
 a hardware computer processor;
 a non-transitory computer readable medium having software instructions stored thereon, the software instructions executable by the hardware computer processor to cause the computing system to perform operations comprising:
  receiving or sensing asset data from each of a plurality of assets, the asset data include at least:
   vehicle data associated with a first plurality of vehicles;
   trailer data associated with a second plurality of trailers; and
   industrial data associated with a third plurality of industrial equipment;
  wherein each of the vehicle data, trailer data, and industrial data includes at least some unique sensor data types;
  generating a user interface configured to display:
   an asset overview panel including identifiers of one or more vehicles, trailers, and industrial equipment;
  receiving a user selection of a first asset of the one or more vehicles, trailers, and industrial equipment included in the asset overview panel;
  in response to the user selection:
   determining a first asset type associated with the first asset;
   accessing configuration data associated with the first asset type, wherein the configuration data comprises a subset of diagnostic parameters associated with the first asset type; and
   updating the user interface to include an asset interface including:
    the subset of diagnostic parameters associated with the first asset type;
    a selectable link to detailed diagnostic data regarding the first asset;
    a run status visualization indicating historical operational status of the first asset; and
    an upcoming maintenance visualization indicating an expected next maintenance date.

2. The system of claim 1, wherein:
the vehicle data includes at least a vehicle location for each of the first plurality of vehicles;
the trailer data includes at least a trailer location for each of the second plurality of trailers.

3. The system of claim 1, wherein the industrial data includes at least a total run hours and current run status of each of the third plurality of industrial equipment.

4. The system of claim 1, wherein the subset of diagnostic parameters is determined based on user selected diagnostic parameters.

5. The system of claim 1, wherein the run status visualization includes, for each of a plurality of time periods, a horizontal or vertical bar with a length representative of the time period and a colored portion indicating a portion of a particular time period in which the first asset was running.

6. The system of claim 1, wherein the upcoming maintenance visualization includes a circular indicator of a time period until the expected next maintenance date, wherein the circular indicator changes color as the expected next maintenance data approaches a current date.

7. The system of claim 1, wherein the asset overview panel further includes a geographic map indicating locations of each of a plurality of assets.

8. The system of claim 7, wherein the geographic map includes a plurality of icons, and wherein each icon represents one of the plurality of assets.

9. The system of claim 8, wherein a shape of each of the plurality of icons representing one of the plurality of assets is determined based on an asset type.

10. The system of claim 8, wherein a color of each of the plurality of icons representing one of the plurality of assets is determined by an asset run status.

11. The system of claim 1, wherein the asset interface further includes an asset utilization visualization indicating utilization data associated with the first asset.

12. The system of claim 11, wherein the asset utilization visualization includes a line graph displaying a total engine hours a day that an asset has been utilized over a time period.

13. The system of claim 11, wherein the utilization data is determined based on a prior selection of available utilization data by a user.

14. The system of claim 1, wherein:
the vehicle data is acquired by a plurality of vehicle devices coupled to the first plurality of vehicles;
the trailer data is acquired by a plurality of trailer devices coupled to the second plurality of trailers; and
the industrial data is acquired by a plurality of industrial devices coupled to the third plurality of industrial equipment.

15. The system of claim 14, wherein at least at least two of the vehicle devices, trailer devices, and industrial devices comprise different hardware.

16. The system of claim 1, wherein the operations further comprise:
in response to receiving a user selection of one or more diagnostic parameters of the subset of diagnostic parameters, updating the asset interface to include a line graph displaying values of the selected one or more diagnostic parameters for a time increment over a time duration.

17. The system of claim 16, wherein the time increment and the time duration are determined based on selection by a user.

18. The system of claim 1, wherein at least some of the plurality of assets are unpowered assets and said receiving asset data from the unpowered assets comprises the computing system sensing the asset data.

19. The system of claim 18, wherein said sensing the asset data comprises energizing a communication module of the unpowered asset, wherein the energizing provides power to the asset to transmit the asset data to the computing system.

20. The system of claim 18, wherein said sensing the asset data comprises analyzing sensor data obtained by the computing system to determine asset data of the unpowered asset.

* * * * *